United States Patent
Leonard

(10) Patent No.: US 6,942,201 B2
(45) Date of Patent: Sep. 13, 2005

(54) VOLUME REDUCING BEAD PLATE FOR AIR SPRING

(75) Inventor: Joshua R. Leonard, Noblesville, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 10/211,049

(22) Filed: Aug. 2, 2002

(65) Prior Publication Data

US 2004/0021258 A1 Feb. 5, 2004

(51) Int. Cl.⁷ .................................................. F16F 9/04
(52) U.S. Cl. ............................... 267/64.27; 267/64.21; 267/64.24; 267/64.19
(58) Field of Search ........................... 267/64.21, 64.23, 267/64.24, 64.27, 64.19; 92/34, 35, 98 D

(56) References Cited

U.S. PATENT DOCUMENTS

| | | | |
|---|---|---|---|
| 2,902,291 A | | 9/1959 | Walker |
| 3,682,464 A | | 8/1972 | Krejcir |
| 4,733,876 A | * | 3/1988 | Heider et al. ............ 280/6.158 |
| 4,796,460 A | | 1/1989 | Smedberg et al. |
| 4,844,429 A | | 7/1989 | Ecktman |
| 4,860,571 A | | 8/1989 | Smedberg et al. |
| 4,946,144 A | | 8/1990 | Geno et al. |
| 5,286,010 A | * | 2/1994 | Pahl et al. ................ 267/64.24 |
| 5,921,532 A | | 7/1999 | Pierce et al. |
| 5,934,652 A | | 8/1999 | Hofacre et al. |
| 5,954,316 A | * | 9/1999 | Voss ......................... 267/64.27 |
| 6,070,861 A | | 6/2000 | Ecktman |
| 6,286,820 B1 | * | 9/2001 | Raulf et al. .............. 267/24.21 |
| 6,386,522 B2 | * | 5/2002 | Brakmann et al. ....... 267/64.27 |
| 6,460,836 B1 | * | 10/2002 | Trowbridge .............. 267/64.27 |

* cited by examiner

*Primary Examiner*—Matthew C. Graham
*Assistant Examiner*—Mariano Sy
(74) *Attorney, Agent, or Firm*—Michael Sand; Michael R. Huber

(57) ABSTRACT

A vehicle air spring assembly having a pair of spaced end members which sealingly engage a flexible bladder to form an internal air chamber having an internal volume. One of the end members is a bead plate which has an annular outer end portion which is crimped to the bladder to provide an air tight seal therebetween. The end plate has a recessed portion located between the outer end portion which projects into the air chamber to reduce the volume of the air chamber to change the spring characteristic of the air spring. A plurality of reinforcing gussets extend between the recessed portion of the bead plate and a surrounding upstanding wall which extends between the outer end portion and recessed portion to enable the bead plate to be clamped by fasteners against an adjacent vehicle component and resist deformation when subjected to internal pressure.

14 Claims, 2 Drawing Sheets

VOLUME REDUCING BEAD PLATE FOR AIR SPRING

BACKGROUND OF THE INVENTION

1. Technical Field

The invention relates to air spring assemblies for vehicle suspensions. More particularly, the invention relates to an air spring assembly in which one of the bead plates, which is sealingly mounted within an open end of the flexible bladder, has a profile which projects into the air chamber to reduce the volume thereof to increase the spring rate.

2. Background Information

Air spring assemblies typically include one or two end plates or bead plates sealingly connected to respective ends of a hollow fabricated reinforced elastomeric bladder. These air springs are used primarily for implementation in motor vehicles for supporting the vehicle body or for use in other types of equipment subject to shock to provide cushioning therefor. The air springs are sealed at the ends to form a pressurized fluid chamber within the elastomeric bladder. The air spring will generate a certain load at a given height and pressure upon the air spring experiencing a road displacement input and the bladder will begin to collapse or extend as the end members move toward or away from each other to yield predictable dynamic load characteristics.

These dynamic load characteristics of the air spring are a function of the internal air pressure, volume and effective area. For a given height, the effective area is determined by dividing the air spring load by the internal pressure. The effective area and internal volume of an air spring is typically controlled by the maximum inflated diameter and length of the fabric reinforced rubber bladder. The effective volume varies with the air spring height.

For certain applications, it may be desirable to increase the spring rate. One manner of increasing the spring rate of an existing air spring having a predetermined height is to decrease the internal volume of the air chamber within the elastomeric bladder. One previous manner of changing the volume is adding a non-compressible media to the inside of the air spring. However, this could leak or corrode the air spring and contaminate the air system.

Often it is desirable to tailor the dynamic load characteristics of the air spring, such as the dynamic spring rate and natural frequency, to fit a particular vehicle or application. However, it is not always practical to change the bladder size for all applications. For example, some vehicles have certain space limitations which do not allow for a larger bladder size. Also, changing the bladder size may effect other characteristics of the air spring, such as the ride of the vehicle on which the air spring is mounted and the load capacity of the air spring.

Thus the need exists for a simple, inexpensive, yet effective air spring assembly which can increase the spring rate of the air spring without modifying the flexible bladder and which enables a preferred crimp sealing arrangement to be utilized therewith for securing the bladder to the end member or bead plate, which plate is subsequently attached to a spaced component of the vehicle.

BRIEF SUMMARY OF THE INVENTION

What the art needs is an air spring assembly which allows for control of the internal volume of the air chamber formed by the flexible bladder to achieve certain dynamic load characteristics and spring rates without having to change the physical size of the bladder.

The invention changes the internal volume of the air spring by using a bead plate having a recessed portion which extends into the air chamber while maintaining a seal with the bladder and providing a mounting surface for mounting the bead plate to a supporting vehicle structure.

Another feature of the invention is to provide the bead plate with a plurality of spaced reinforcing gussets having a generally semi-conical or triangular-shaped configuration, which are spaced about the junction of a recessed central portion of the bead plate with an upstanding cylindrical wall which connects with a curved outer crimp end of the bead plate.

Another feature is to provide a plurality of openings formed in reinforcing bosses provided in the recessed central portion of the bead plate for receiving fasteners therethrough for securing the bead plate to the vehicle structure.

A further advantage of the invention is being able to form the bead plate of a single stamped one piece construction, or if desired, a two piece member composed of plastic, aluminum or steel; and which has sufficient strength to enable a crimped connection to be made with a beaded end of the elastomeric bladder.

Thus in essence, the volume reducing bead plate of the present invention provides for a way to alter the spring rate for an air spring without changing the height or diameter of the air spring or its manner of mounting between spaced vehicle components.

BRIEF DESCRIPTION OF THE DRAWINGS

Similar numerals refer to similar parts throughout the drawings.

DETAILED DESCRIPTION OF THE INVENTION

Figure 1:
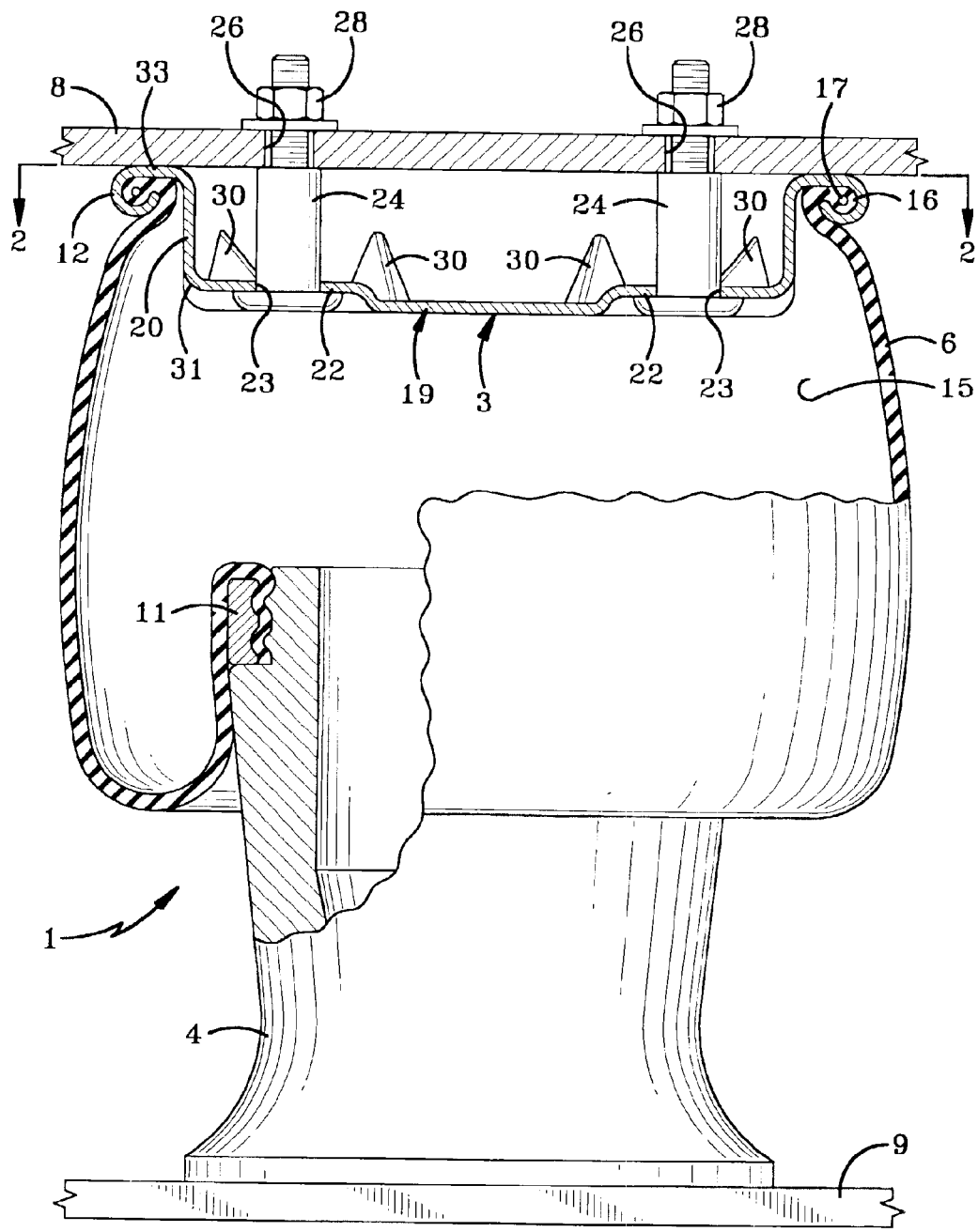
FIG. 1 is a side elevational view with portions broken away and in section, showing the volume reducing bead plate of the present invention incorporated into an air spring mounted between spaced structures.
Figure 2:
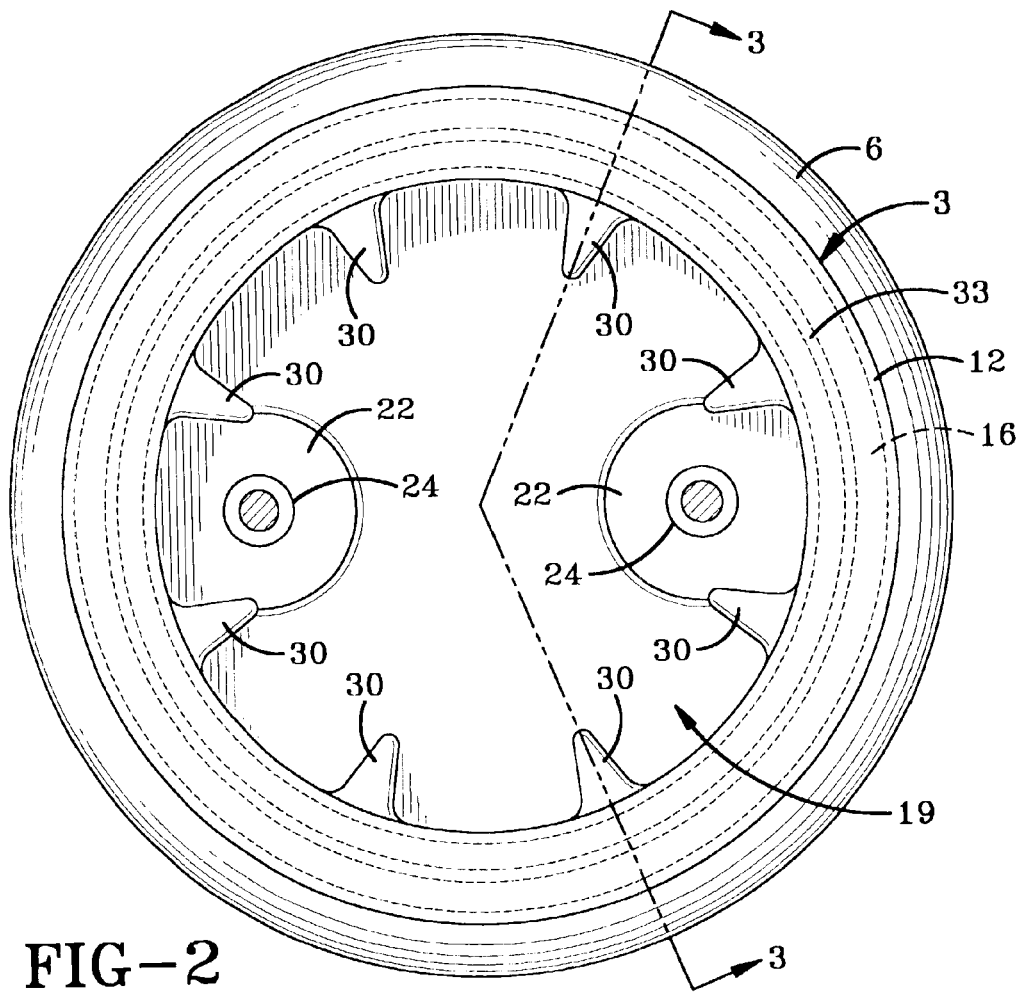
FIG. 2 is a sectional view taken along arrows 2—2, FIG. 1.
Figure 3:
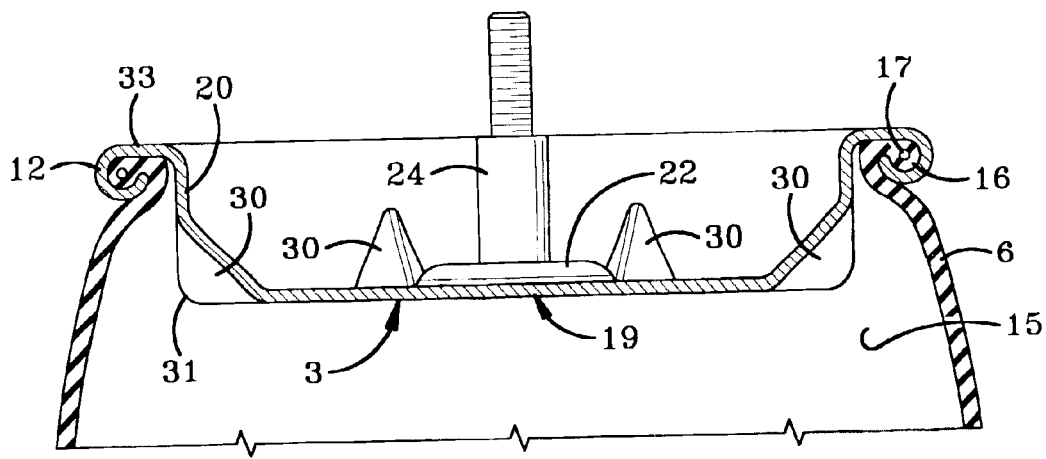
FIG. 3 is a fragmentary sectional view taken along line 3—3, FIG. 2.

A preferred embodiment of the vehicle air spring assembly according to the present invention, is shown in FIGS. 1–3 and is indicated generally at 1. As shown in FIG. 1, air spring assembly 1 includes a top bead plate or end plate 3, a bottom end member or piston 4 and a flexible bladder or bellows 6 extending between and connected to bead plate 3 and piston 4. Bead plate 3 and piston 4 are attached to two spaced members 8 and 9 respectively, for providing cushioning therebetween. Members 8 and 9 may be parts of a motor vehicle such as a vehicle chassis and vehicle axle or any other device where cushioning is desired between two spaced end members.

Bladder 6 is sealingly engaged with piston 4 by a usual clamp ring 11 and to bead plate 3 by a rolled crimp end 12 to form a pressurized fluid or air chamber 15. Bladder 6 is preferably formed of an elastomeric material and may include fabric cords embedded therein to strengthen the bladder and restrict the inflated diameter as the bladder is expanded and compressed during operation of air spring assembly 1. Bladder 6 includes an enlarged beaded end 16 having an internal annular bead ring 17 which is engaged with crimp end 12 to provide a fluid tight sealing engagement with bead plate 3. If desired, piston 4 can be other types of end members and use other types of clamping arrangements other than clamp ring 11 without effecting the concept of the invention.

In accordance with one of the features of the invention, bead plate 3 has an annular configuration with a recessed central portion indicated generally at 19, which is located between crimp end 12 and is connected thereto by an upstanding, preferably cylindrical wall 20 and flat annular wall portion 33. A pair of bosses 22 (FIG. 2) are formed in central portion 19 at diametrically opposite locations, each formed with a circular hole 23 through which bolts 24 extend for mounting bead plate 3 on support member 8. A pair of holes 26 are formed in support member 8 and aligned with holes 23 for receiving a threaded end of bolt 24 therethrough for securement with nuts 28. Other types and numbers of fasteners can be utilized for securing bead plate 3 to member 8 than that shown in the drawings without effecting the invention.

In accordance with another feature of the invention, a plurality of reinforcing gussets 30 are, formed at an annular junction 31 between central portion 19 and cylindrical wall 20 of bead plate 3 to provide structural strength and rigidity to the bead plate. Gussets 30 preferably have a semi-conical or triangular configuration. In the preferred embodiment as shown in FIG. 2, bead plate 3 will have eight similar gussets 30 spaced equally circumferentially along junction 31. These gussets provide strength and rigidity, especially to cylindrical wall 20 and to its peripheral crimp end 12, to provide and maintain a tight clamping engagement with bladder 6 and for abutting clamping engagement of wall portion 33 of bead plate 3 which extends between rolled crimp end 12 and cylindrical wall 20. Thus gussets 30 enable the attachment fasteners to be tightened sufficiently to provide a secure clamping engagement of the bead plate by means of straight wall portion 33 being clamped tightly against the underside surface of member 8 without bending cylindrical wall 20 or effecting the clamping sealing engagement with bead end 16 of bladder 6. Bead plate 3 may be provided with one or more openings (not shown) for connection of a fluid supply line which connects with a remote compressor or other source of pressurized fluid for inflating bladder 6. Various types of fluids can be utilized with air being the most common.

As best seen in FIG. 1, the recessed central portion 19 of bead plate 3 will extend into air chamber 15 and reduce the volume thereof which will change the spring characteristic of the air spring. Thus by varying the length of cylindrical wall 20, various spring rates can be achieved depending upon the distance that recessed central portion 19 extends into the air chamber. Although central portion 19 is shown as having a circular and/or relatively flat configuration (FIG. 2), it could have other configurations with various steps and elevated portions without effecting the concept of the invention. The important feature is that it projects into the air chamber to reduce the volume thereof.

In the heretofore air springs having beaded end plates, central portion 19 would generally be at the same level with annular planar surface 33 which would increase the volume of air chamber 15. Thus without changing the height or configuration of the air spring, its volume can be easily adjusted by utilizing various bead plates having a predetermined depth to the recessed central portion thereof. Likewise, the recessed central portion also provides for the location of the mounting bolts as in the heretofore disc-shaped bead plates. This enables the same mounting holes to be utilized in the supporting structure than those used with the heretofore flat, disc-shaped bead end plates. The incorporation of the reinforcing gussets enables the desired internal pressure to be achieved without deforming or distorting the bead plate, and in particular, wall 20 and crimp end 12 thereof.

Additionally, the recessed central portion can be used to clear mounting obstacles, such as other fasteners or structures, on support 8. It may also be used to center or locate the air spring on support 8.

Preferably, bead plate 3 will be stamped as a single piece member of steel or aluminum, but if desired, could be a two piece composite formed of metal and a high strength plastic, or could be a single piece of high strength plastic without affecting the concept of the invention. It could also be connected with a clamp ring similar to 11.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. An air spring assembly for mounting on and between first and second spaced apart components moveable with respect to each other, said air spring assembly comprising:
   first and second end members adapted to be mounted on said first and second spaced apart components respectively;
   a flexible bladder extending between and sealingly connected to said end members to form a pressurized air chamber therebetween;
   said first end member being a bead plate having an annular configuration with an annular outer end portion crimped about a bead formed on the end of the bladder to provide a connection sealingly connecting an end of the bladder to the outer end portion of the bead plate, said outer end portion of the bead plate having an annular flat wall portion for mounting said first end member against the first spaced apart component, and an upstanding substantially cylindrical wall extending between the flat wall portion of the bead plate and a recessed central portion and inwardly into the air chamber to effectively reduce the internal volume of said air chamber; and
   a plurality of spaced reinforcing gussets extending between the upstanding wall and recessed central portion of the bead plate.

2. The air spring assembly defined in claim 1 in which the reinforcing gussets have a semi-conical or triangular configuration.

3. The air spring assembly defined in claim 2 in which eight reinforcing gussets are spaced equally circumferentially about a junction of the upstanding wall and recessed central portion of the bead plate.

4. The air spring assembly defined in claim 1 in which a plurality of holes are formed in the recessed central portion of the bead plate for receiving fasteners therethrough.

5. The air spring assembly defined in claim 4 in which each of the holes is formed in a boss extending outwardly from the recessed central portion of the bead plate.

6. The air spring assembly defined in claim 4 in which the plurality of holes include two holes formed in the recessed central portion of the bead plate and located diametrically opposite each other.

7. An air spring assembly comprising:

first and second end members adapted to be mounted on spaced apart components movable with respect to each other;

a flexible bladder extending between and sealingly connected to said end members to form a pressurized air chamber therebetween;

said first end member is a bead plate having an annular outer end portion and a recessed central portion extending inwardly into the air chamber effectively reducing the internal volume of said air chamber, said outer end portion being crimped about a bead formed on the end of the bladder to provide a connection sealingly connecting an end of the bladder to the outer end portion of the bead plate;

a plurality of holes formed in the central portion of the bead plate for receiving fasteners therethrough; and each of said holes being formed in a boss extending outwardly from the central portion of the bead plate.

8. The air spring assembly defined in claim 7 wherein the recessed central portion of the bead plate is substantially flat.

9. An air spring having a variable and changeable bead plate for changing the internal volume of the air spring comprising:

first and second end members adapted to be mounted on spaced apart components movable with respect to each other;

a flexible bladder extending between and sealingly connected to said end members to form a pressurized air chamber therebetween; and said first end member being a variable bead plate chosen from a plurality of bead plates depending upon a desired spring rate to be provided by the air spring, said chosen bead plate having an annular configuration with an outer crimp end providing an air tight connection with an open end of the bladder and a wall portion for mounting the first end member on one of the spaced apart components said chosen bead plate further having a recessed central portion extending between the crimp end and connected thereto by an upstanding annular wall terminating adjacent the crimp end, said annular wall and recessed central portion extending inwardly into the air chamber to effectively reduce the internal volume of said air chamber, with the said annular wall varying in length depending upon the spring rate desired.

10. The air spring defined in claim 9 in which a plurality of reinforcing gussets are spaced equally circumferentially about a junction of the upstanding annular wall and the recessed central portion of the bead plate.

11. The air spring defined in claim 9 in which a plurality of holes are formed in the recessed central portion of the bead plate for receiving fasteners therethrough.

12. The air spring defined in claim 11 in which each of the holes is formed in a boss extending outwardly from the recessed central portion of the bead plate.

13. The air spring defined in claim 9 wherein the recessed central portion of the bead plate is substantially flat.

14. The air spring defined in claim 9 wherein the annular wall is substantially cylindrical.

* * * * *

UNITED STATES PATENT AND TRADEMARK OFFICE
CERTIFICATE OF CORRECTION

PATENT NO. : 6,942,201 B2
APPLICATION NO. : 10/211049
DATED : September 23, 2005
INVENTOR(S) : Joshua R. Leonard It is certified that error appears in the above-identified patent and that said Letters Patent is hereby corrected as shown below:

Column 4, lines 44-45, change the phrase "bead plate and a recessed central portion" to add "substantially flat" to read --bead plate and a substantially flat recessed central portion--.

Column 4, line 45, change the phrase "recessed central portion and inwardly" to replace "and" with "extending" to read --recessed central portion extending inwardly--.

Column 4, line 46, change the phrase "chamber to effectively reduce" to add "and completely across width of the bead plate" to read --chamber and completely across the width of the bead plate to effectively reduce--.

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,942,201 B2
APPLICATION NO. : 10/211049
DATED : September 13, 2005
INVENTOR(S) : Joshua R. Leonard It is certified that error appears in the above-identified patent and that said Letters Patent is hereby corrected as shown below:

Column 4, lines 44-45, change the phrase "bead plate and a recessed central portion" to add "substantially flat" to read --bead plate and a substantially flat recessed central portion--.

Column 4, line 45, change the phrase "recessed central portion and inwardly" to replace "and" with "extending" to read --recessed central portion extending inwardly--.

Column 4, line 46, change the phrase "chamber to effectively reduce" to add "and completely across width of the bead plate" to read --chamber and completely across the width of the bead plate to effectively reduce--.

This Certificate supersedes Certificate of Correction issued August 8, 2006.

Signed and Sealed this

Twelfth Day of September, 2006

JON W. DUDAS
*Director of the United States Patent and Trademark Office*